US011867083B2

(12) United States Patent
Boeff et al.

(10) Patent No.: US 11,867,083 B2
(45) Date of Patent: Jan. 9, 2024

(54) TURBINE BLADE AND METHOD FOR MACHINING SAME

(71) Applicant: Siemens Energy Global GmbH & Co. KG, Bayern (DE)

(72) Inventors: Martin Boeff, Gelsenkirchen-Buer (DE); Thomas Ruda, Moers (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/009,402

(22) PCT Filed: May 21, 2021

(86) PCT No.: PCT/EP2021/063617

§ 371 (c)(1),
(2) Date: Dec. 9, 2022

(87) PCT Pub. No.: WO2021/259569

PCT Pub. Date: Dec. 30, 2021

(65) Prior Publication Data

US 2023/0220778 A1 Jul. 13, 2023

(30) Foreign Application Priority Data

Jun. 22, 2020 (DE) ..................... 10 2020 207 646.4

(51) Int. Cl.
*F01D 5/18* (2006.01)
*F01D 5/30* (2006.01)

(52) U.S. Cl.
CPC .................. *F01D 5/18* (2013.01); *F01D 5/30* (2013.01); *F05D 2220/32* (2013.01);
(Continued)

(58) Field of Classification Search
CPC .......... F01D 5/18; F01D 5/30; F05D 2220/32; F05D 2240/304; F05D 2240/305
(Continued)

(56) References Cited

U.S. PATENT DOCUMENTS

2003/0108423 A1 6/2003 Morgan
2003/0108425 A1 6/2003 Bariaud
(Continued)

FOREIGN PATENT DOCUMENTS

DE 602004003331 T2 6/2007
DE 60221628 T2 5/2008
(Continued)

OTHER PUBLICATIONS

PCT International Search Report and Written Opinion of International Searching Authority dated Sep. 9, 2021 corresponding to PCT International Application No. PCT/EP20211063617 filed May 21, 2022.

*Primary Examiner* — Jorge L Leon, Jr.
(74) *Attorney, Agent, or Firm* — Wolter Van Dyke Davis, PLLC

(57) ABSTRACT

A turbine blade for a gas turbine, having a blade root and an aerodynamically curved blade airfoil arranged above the blade root. The blade airfoil has a pressure-side and a suction-side blade wall, together extending from a leading edge, that can receive a flow of working medium, to a trailing edge. A multiplicity of cooling air outlet openings are formed on the pressure-side blade wall, which extend upstream from the trailing edge with respect to the flow direction, and through these openings cooling air that is conveyed through the interior of the blade airfoil can exit. At least one of the cooling air outlet openings has a substantially rectangular or trapezoidal shape with rounded corners. At least the lower corner, pointing towards the leading edge, of the cooling air outlet opening forms a relief notch, which
(Continued)

projects outwardly from the rectangular shape, with a rounded notch bottom.

7 Claims, 3 Drawing Sheets

(52) U.S. Cl.
CPC .. *F05D 2240/304* (2013.01); *F05D 2240/305* (2013.01); *F05D 2260/202* (2013.01)

(58) Field of Classification Search
USPC ........................................................ 416/90 R
See application file for complete search history.

(56) References Cited

U.S. PATENT DOCUMENTS

| | | | | |
|---|---|---|---|---|
| 2005/0249593 | A1* | 11/2005 | Boury | F01D 9/041 416/97 R |
| 2010/0034662 | A1* | 2/2010 | Jendrix | B22C 9/10 416/97 R |
| 2013/0259645 | A1 | 10/2013 | Bergholz, Jr. | |
| 2013/0336767 | A1 | 12/2013 | Levine | |
| 2014/0003962 | A1 | 1/2014 | Okita | |
| 2014/0169962 | A1* | 6/2014 | Lee | F01D 5/186 416/1 |
| 2014/0271228 | A1 | 9/2014 | Okita | |
| 2015/0147158 | A1* | 5/2015 | Wang | F01D 9/065 415/115 |
| 2017/0191368 | A1* | 7/2017 | Dujol | F01D 9/065 |
| 2017/0350257 | A1* | 12/2017 | Heselhaus | F01D 5/20 |
| 2019/0178090 | A1* | 6/2019 | Meier | F01D 5/3007 |

FOREIGN PATENT DOCUMENTS

| | | | |
|---|---|---|---|
| EP | 1318274 | A1 | 6/2003 |
| EP | 1555390 | A1 | 7/2005 |
| EP | 2685049 | A1 | 1/2014 |
| EP | 2787173 | A1 | 10/2014 |
| WO | 2016068856 | A1 | 5/2016 |

* cited by examiner

TURBINE BLADE AND METHOD FOR MACHINING SAME

CROSS REFERENCE TO RELATED APPLICATIONS

This application is the US National Stage of International Application No. PCT/EP2021/063617 filed 21 May 2021, and claims the benefit thereof. The International Application claims the benefit of German Application No. DE 10 2020 207 646.4 filed 22 Jun. 2020. All of the applications are incorporated by reference herein in their entirety.

FIELD OF INVENTION

The invention relates to a turbine blade for a gas turbine with a blade root and an aerodynamically curved blade leaf, arranged above the blade root, wherein the blade leaf has a pressure-side blade wall and a suction-side blade wall which extend together from a leading edge, onto which a working medium can flow, of the blade leaf to a trailing edge of the blade leaf, wherein a plurality of cooling-air outlet openings are formed on the pressure-side blade wall which, starting from the trailing edge, each extend upstream relative to the direction of flow of a working medium which flows around the blade leaf and through which cooling air routed through the inside of the blade leaf can issue, wherein at least one of the cooling-air outlet openings has an essentially rectangular or trapezoidal shape with rounded corners which preferably widens out in the direction in which the cooling air issues. The invention moreover relates to a method for machining such a turbine blade.

BACKGROUND OF INVENTION

Turbine blades of the type mentioned at the beginning are known from the prior art in different embodiments. During operation, they are exposed to high thermal stresses, as a result of which their blade leaves are cooled in order to increase their lifetime. For this purpose, cooling air is introduced through the blade root into the blade leaf and issues essentially axially into the flow duct of the working medium through the cooling-air outlet openings provided on the pressure-side blade wall in the region of the trailing edge. The cooling-air outlet openings have an essentially trapezoidal and/or rectangular shape which widens out in the direction in which the cooling air issues and are often also referred to as cutback openings. There is a problem, on the one hand, that geometrical stresses are induced in the blade leaf by the provision of such cooling-air outlet openings and, on the other hand, that the cooling caused by the cooling air is not uniform in the region of the cooling-air outlet openings, which entails thermally induced stresses. These geometrical and thermal stresses can limit the lifetime of the turbine blades and mean that turbine blades often have to be replaced as part of maintenance work. Attempts to overcome the negative effects of the stresses by reinforcing the blade leaf in the region of the cooling-air outlet openings have proved to be unsuccessful. As a result, either a greater degree of risk has been accepted or the period for which the turbine blades are used has been restricted.

SUMMARY OF INVENTION

Starting from this prior art, an object of the present invention is to provide an improved turbine blade of the type mentioned at the beginning.

In order to achieve this object, the present invention provides a turbine blade for a gas turbine with a blade root and an aerodynamically curved blade leaf arranged above the blade root, wherein the blade leaf has a pressure-side blade wall and a suction-side blade wall which extend together from a leading edge, onto which a working medium can flow, of the blade leaf to a trailing edge of the blade leaf, wherein a plurality of cooling-air outlet openings are formed on the pressure-side blade wall which, starting from the trailing edge, each extend upstream relative to the direction of flow of a working medium which flows around the blade leaf and through which cooling air routed through the inside of the blade leaf can issue, wherein at least one of the cooling-air outlet openings has an essentially rectangular or trapezoidal shape with rounded corners which preferably widens out in the direction in which the cooling air issues, characterized in that at least the lower corner, facing the leading edge, of this at least one cooling-air outlet opening forms a relief notch which projects outward from the rectangular shape and has a rounded notch base. It has been established during the development of turbine blades that the high stresses in the region of the cooling-air outlet openings are primarily thermally caused geometrically only to a small extent. Against this background, the geometry of at least the most highly stressed cooling-air outlet opening has been redesigned such that a relief notch with a rounded notch base has been added in the lower corner facing the leading edge. Even though this relief notch significantly reduces the rigidity of the turbine blade in the region of the corresponding cooling-air outlet opening, it assists the thermal expansion of the blade leaf, as a result of which the stresses within the turbine blade as a whole are significantly reduced, which entails an appreciable increase in the lifetime. It was also possible to verify this positive effect by 3D finite element analysis.

According to a variant of the present invention, the relief notch continues the line of a lower edge of the cooling outlet opening, wherein the notch base arranged above the lower edge of the cooling outlet opening faces in the direction of the leading edge of the blade leaf. In this variant, the blade leaf can be produced in the region of the cooling-air outlet opening in the casting process with no undercut, which is desirable in principle.

According to a further variant of the present invention, the relief notch extends, starting from the lower edge of the cooling outlet opening, obliquely downward at an obtuse angle, wherein the notch base arranged below the lower edge of the cooling outlet opening faces in the direction of the blade root. This variant is advantageous in terms of stress. However, it cannot be manufactured in the casting process without disruptive undercuts.

The relief notch preferably widens out, starting from its notch base, in the manner of a chalice, as a result of which particularly good thermal expansibility of the blade leaf is obtained in the region of the cooling-air outlet opening.

The at least one cooling-air outlet opening is advantageously the lowest cooling-air outlet opening because it is there that the highest thermal stresses occur.

The present invention moreover provides a method for machining a turbine blade with a blade root and an aerodynamically curved blade leaf, wherein the blade leaf has a pressure-side blade wall and a suction-side blade wall which extend together from a leading edge, onto which a working medium can flow, of the blade leaf to a trailing edge of the blade leaf, wherein a plurality of cooling-air outlet openings are formed on the pressure-side blade wall which, starting from the trailing edge, each extend upstream relative to the direction of a working medium which flows around the blade leaf and through which cooling air routed through the inside of the blade leaf can issue, and wherein one of the cooling-air outlet openings has an essentially rectangular or trapezoidal shape with rounded corners, characterized in that a relief notch which projects outward from the rectangular shape and has a rounded notch base is formed in at least the lower corner, facing the leading edge, of this at least one cooling-air outlet opening in order to produce a turbine blade according to the invention.

BRIEF DESCRIPTION OF THE DRAWINGS

Further features and advantages of the present invention will become clear with the aid of the following description embodiments with reference to the attached drawings, in which.

DETAILED DESCRIPTION OF INVENTION

Figure 1:
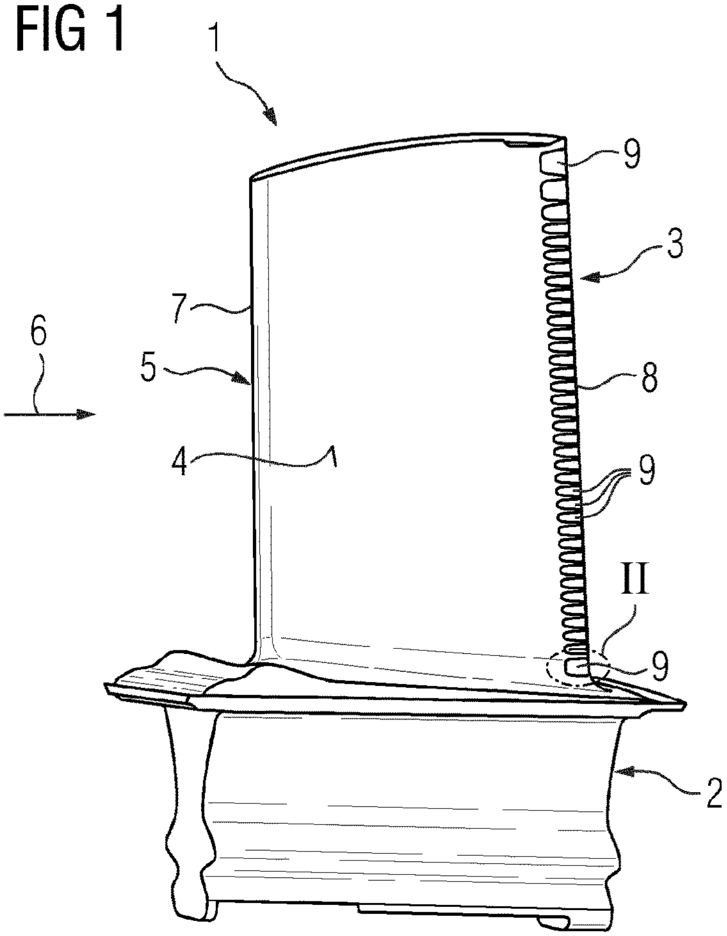
FIG. 1 shows a perspective view of a known turbine blade.

The same reference numerals refer below to similar components or component regions.

FIG. 1 shows a known turbine blade 1 for a gas turbine, which in the present case is a rotor blade. The turbine blade 1 comprises a blade root 2 and an aerodynamically curved blade leaf 3 arranged above the blade root 2. The blade leaf 3 has a pressure-side blade wall 4 and a suction-side blade wall 5 which extend together from a leading edge 7, onto which a working medium can flow in the direction of the arrow 6, of the blade leaf 3 to a trailing edge 8 of the blade leaf 3. A series of cooling-air outlet openings 9, which in the present case are designed as so-called cutback openings, are provided on the pressure-side blade wall 4 along the trailing edge 8. The cooling-air outlet openings 9 each extend upstream relative to the direction of flow of the working medium which flows around the blade leaf 3 and serve to emit cooling air, routed through cooling ducts (not illustrated in detail in the present case) which are present inside the blade leaf 3, essentially axially into a flow duct of the working medium. The cooling-air outlet openings 9 have an essentially rectangular or trapezoidal shape with rounded corners 10 which in the present case each widens out in the direction in which the cooling air issues. In FIG. 1, the shapes of the lowest cooling-air outlet opening 9 and the top three cooling-air outlet openings 9 are considered as rather rectangular, even though they widen out slightly in the direction in which the cooling air issues, whilst all the other cooling-air outlet openings 9 have a rather trapezoidal design.

Figure 2:
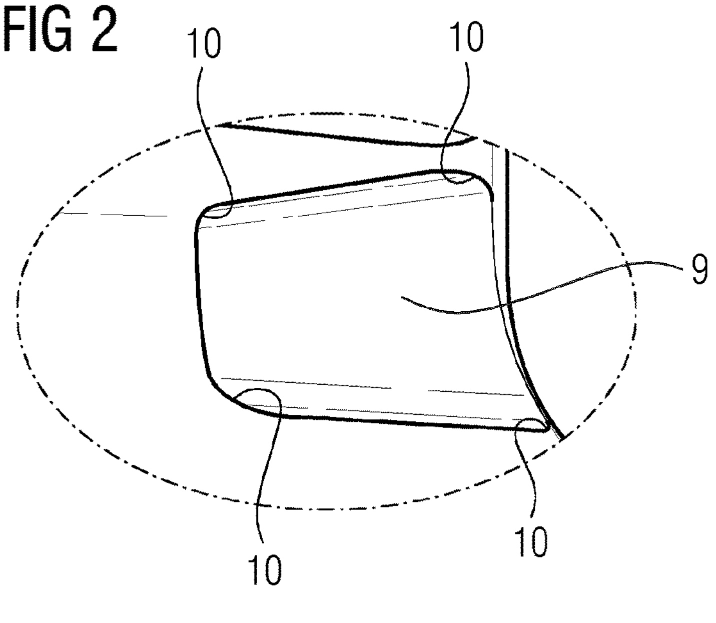
FIG. 2 shows an enlarged view of the detail labeled with the reference numeral II which shows a cooling-air outlet opening of a known design.

FIG. 2 shows an enlarged view of the lowest cooling-air outlet opening 9 which is characterized in that, in the region thereof, the thermal stresses are particularly high or highest during the operation of the turbine blade 1.

Figure 3:
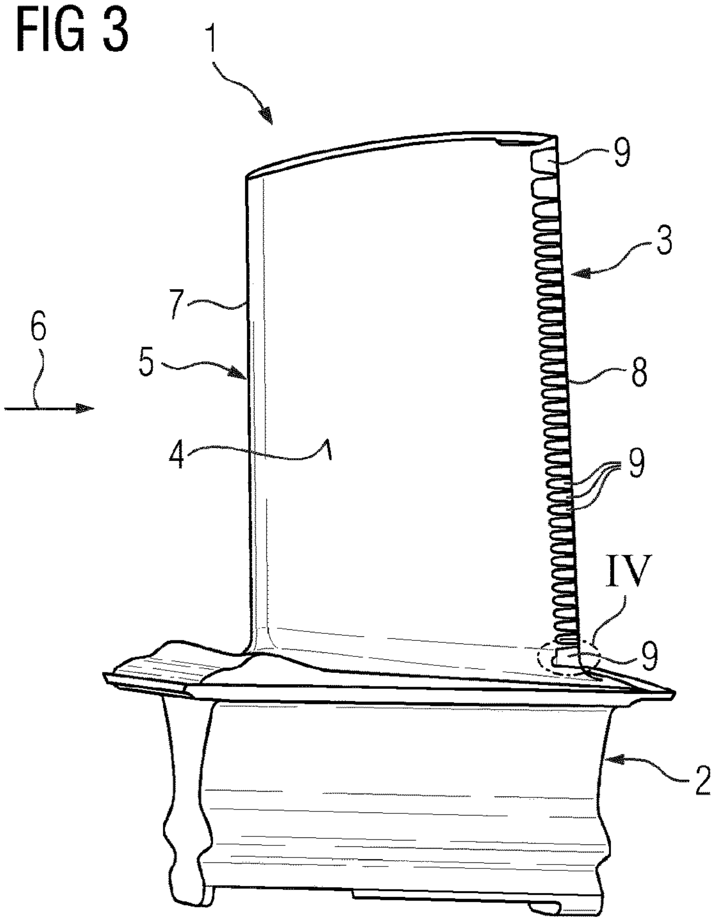
FIG. 3 shows a perspective view of the turbine blade shown in FIG. 1 after a method according to an embodiment of the present invention has been performed.
Figure 4:
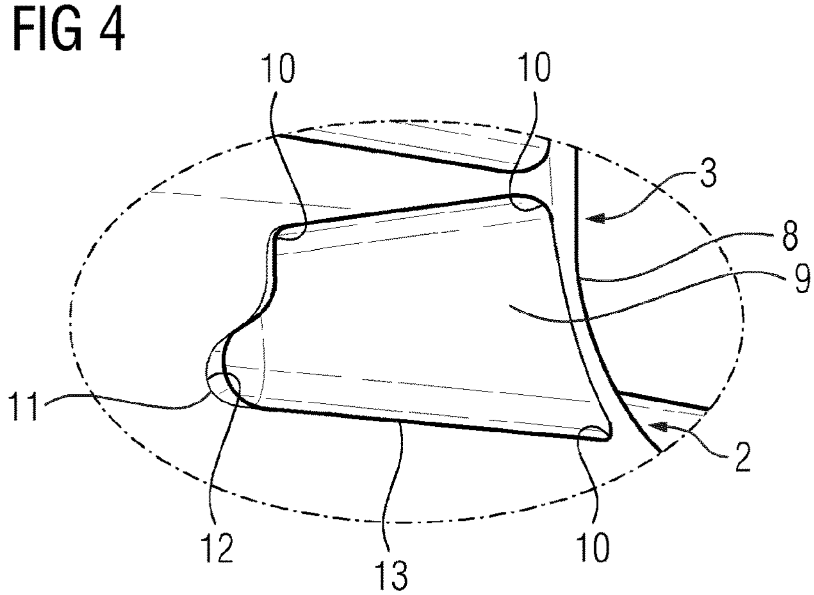
FIG. 4 shows an enlarged view of the detail labeled with the reference numeral IV which shows a cooling-air outlet opening with a relief notch according to a first embodiment of the present invention.

FIGS. 3 and 4 show a turbine blade 1 according to a first embodiment of the present invention which has been produced starting from the turbine blade 1 illustrated in FIGS. 1 and 2.

The turbine blade 1 shown in FIGS. 3 and 4 differs from the turbine blade 1 shown in FIGS. 1 and 2 only in terms of the embodiment of the lowest cooling-air outlet opening 9, as can be seen by comparing FIGS. 2 and 4. Starting from the cooling-air outlet opening 9 illustrated in FIG. 2, the lower corner 10, facing the leading edge, of the cooling-air outlet opening 9 shown in FIG. 4 has been provided with a relief notch 11 which projects outward from the rectangular shape and has a rounded notch base 12. In the present case, the relief notch 11 continues the line of the lower edge 13 of the cooling outlet opening 9, wherein the notch base 12 arranged above the lower edge 13 of the cooling outlet opening 9 faces in the direction of the leading edge 7 of the blade leaf 3. Such a relief notch 11 can be introduced into the cooling-air outlet opening 9 illustrated in FIG. 2, for example, using a material-removal machining method. It results in a significant reduction in thermal stresses in the region of the cooling-air outlet opening 9 during the operation of the turbine blade 1, which entails an appreciable extension of the lifetime of the turbine blade 1.

It should be noted that it is of course also alternatively possible to manufacture the turbine blade 1 shown in FIGS. 3 and 4 as part of a new production process. Thus, the turbine blade 1 illustrated in FIGS. 3 and 4 can, for example, be cast and if required thermally and/or mechanically treated thereafter. The cooling-air outlet opening 9 illustrated in FIG. 4 is particularly well suited to being produced by casting as the relief notch 11 does not create any undercut regions which would make the geometry of the casting core or cores unnecessarily complicated.

Figure 5:
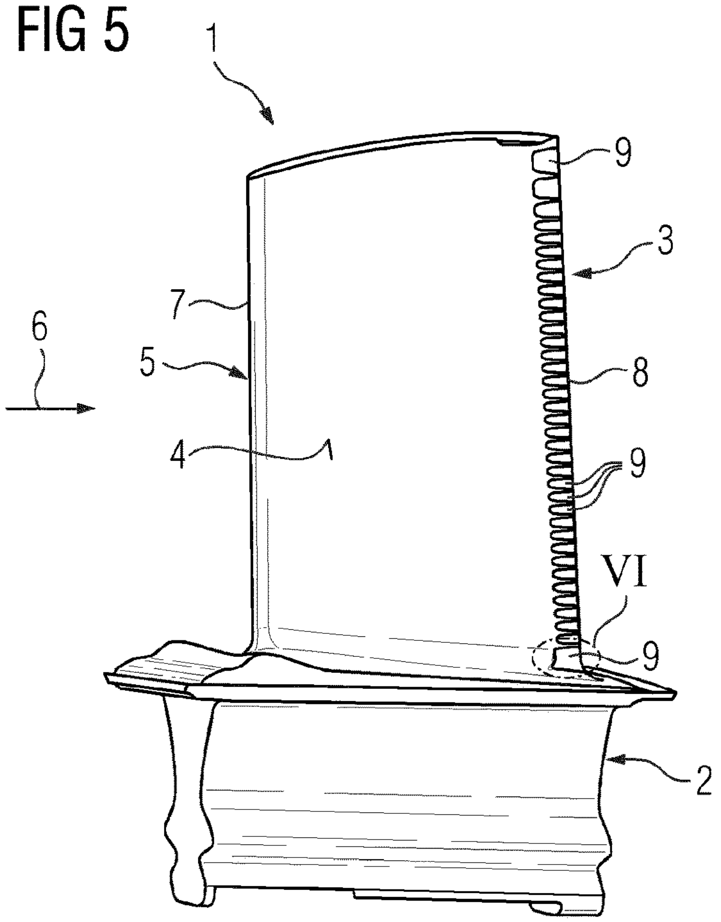
FIG. 5 shows a perspective view of the turbine blade shown in FIG. 1 after a method according to an embodiment of the present invention has been performed.
Figure 6:
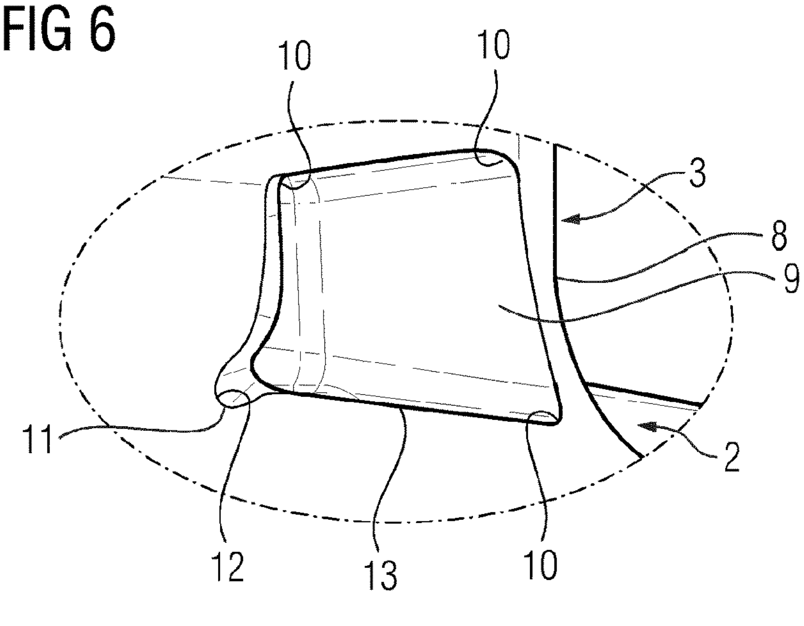
FIG. 6 shows an enlarged view of the detail labeled with the reference numeral VI which shows a cooling-air outlet opening with a relief notch according to a second embodiment of the present invention.

FIGS. 5 and 6 show a turbine blade 1 according to a second embodiment of the present invention which has been produced starting from the turbine blade 1 illustrated in FIGS. 1 and 2.

The turbine blade 1 illustrated in FIGS. 5 and 6 differs from the turbine blade 1 shown in FIGS. 1 and 2 only in terms of the embodiment of the lowest cooling-air outlet opening 9, as can be seen by comparing FIGS. 2 and 6. Starting from the cooling-air outlet opening 9 illustrated in FIG. 2, the lower corner 10, facing the leading edge 7, of the cooling-air outlet opening 9 shown in FIG. 6 has been provided with a relief notch 11 which projects outward from the rectangular shape and has a rounded notch base 12. The relief notch 11 extends, starting from the lower edge 13 of the cooling outlet opening 9, obliquely downward at an obtuse angle. The notch base 12 arranged below the lower edge 13 of the cooling outlet opening 9 faces in the direction of the blade root 2, wherein the relief notch 11 widens out, starting from its notch base 12, in the manner of a chalice.

The relief notch 11 shown in FIG. 6 can also be introduced into the cooling-air outlet opening 9 illustrated in FIG. 2, for example, using a material-removal machining method. It results in a significant reduction in thermal stresses in the region of the cooling-air outlet opening 9 during the operation of the turbine blade 1, which entails an appreciable extension of the lifetime of the turbine blade 1. With reference to the reduction of stress, the shape of the cooling-air outlet opening 9 or its relief notch 11 illustrated in FIG. 6 is more favorable than the shape shown in FIG. 4. However, it has undercuts which can be produced using casting only at a high cost, when the turbine blade 1 illustrated in FIGS. 5 and 6 is produced as part of a new production process.

Although the invention has been illustrated and described in detail by the preferred exemplary embodiment, the invention is not limited by the disclosed examples and other variations can be derived therefrom by a person skilled in the art without going beyond the protective scope of the invention. In particular, further cooling-air outlet openings 9 and/or a cooling-air outlet opening 9 other than the lowest one can also be provided with a relief notch 11.

The invention claimed is:

1. A turbine blade for a gas turbine, comprising:

a blade root; and an aerodynamically curved blade leaf extending from the blade root, the blade leaf including:

a leading edge;

a trailing edge;

a pressure-side blade wall and a suction-side blade wall each extending from the leading edge to the trailing edge so as to guide a working medium around the blade leaf; and a plurality of cooling-air outlet openings configured to emit cooling air routed through an inside of the blade leaf, each cooling-air outlet opening formed on the pressure-side blade wall so as to extend upstream from the trailing edge relative to a direction of flow of the working medium, wherein at least one cooling-air outlet opening of the plurality of cooling-air outlet openings includes a rectangular or trapezoidal shape with rounded corners, wherein at least one of the rounded corners on an upstream side and closest to the blade root, forms a relief notch which projects outward from the rectangular or trapezoidal shape and includes a rounded notch base.

2. The turbine blade as claimed in claim 1, wherein the relief notch continues a line of a lower edge of the at least one cooling-air outlet opening such that the rounded notch base is arranged above the lower edge and is recessed toward the leading edge of the blade leaf.

3. The turbine blade as claimed in claim 1, wherein the relief notch extends obliquely downward from a lower edge of the at least one cooling-air outlet opening at an obtuse angle, and wherein the rounded notch base is arranged below the lower edge and is recessed toward the blade root.

4. The turbine blade as claimed in claim 3, wherein the relief notch, starting from the notch base, widens out toward the lower edge so as to be chalice-shaped.

5. The turbine blade as claimed in claim 1, wherein the at least one cooling-air outlet opening is a lowest cooling-air outlet opening closest to the blade root.

6. The turbine blade as claimed in claim 1, wherein the at least one cooling-air outlet opening widens out from the upstream side toward the trailing edge.

7. A method for machining the turbine blade of claim 1, the method comprising:

forming the relief notch at the at least one cooling-air outlet opening, the relief notch including the rounded notch base projecting outward from a lower corner of the rectangular or trapezoidal shape, the lower corner arranged on the upstream side and closest to the blade root.

* * * * *